Aug. 7, 1945.   A. R. VAN C. WARRINGTON   2,381,375
PROTECTIVE APPARATUS
Filed Dec. 9, 1942

Inventor:
Albert R. van C. Warrington
by Harry E. Dunham
His Attorney.

Patented Aug. 7, 1945

2,381,375

UNITED STATES PATENT OFFICE 2,381,375

PROTECTIVE APPARATUS

Albert R. van C. Warrington, Wallingford, Pa., assignor to General Electric Company, a corporation of New York Application December 9, 1942, Serial No. 468,384

12 Claims. (Cl. 175—294)

My invention relates to protective apparatus for electric circuits and more particularly to relays or electroresponsive devices and especially relays of the so-called distance type whose time of action is a function of the distance between the fault and the relay.

Distance relays of either the so-called impedance or reactance type are energized in response to both a current and a voltage quantity of the circuit so as to give an impedance response or a so-called distance response. Usually a current quantity is used to tend to cause operation and a voltage quantity to tend to restrain operation. The time of operation is caused to be dependent upon the distance between the relay and the fault. In other words, the closer the fault is to the relay, the more likely or the faster the relay operates. With relays of this type it is, of course, possible to isolate by proper correlation thereof, a minimum portion of the system having a fault thereon. Relays of this type are disclosed in United States Letters Patent 1,814,869—Traver, and 1,815,861—Mayr. My invention is particularly concerned with a new and improved relay of the distance type whose time of operation is a function of the distance between the fault and the relay.

Accordingly, it is an object of my invention to provide a new and improved relay of the type which functions and which adjusts its time of operation according to its nearness to or distance from a fault on the system.

Further objects and advantages of my invention will become apparent as the following description proceeds and the features of novelty which characterize my invention will be pointed out with particularity in the claims annexed to and forming a part of this specification.

Figure 1:
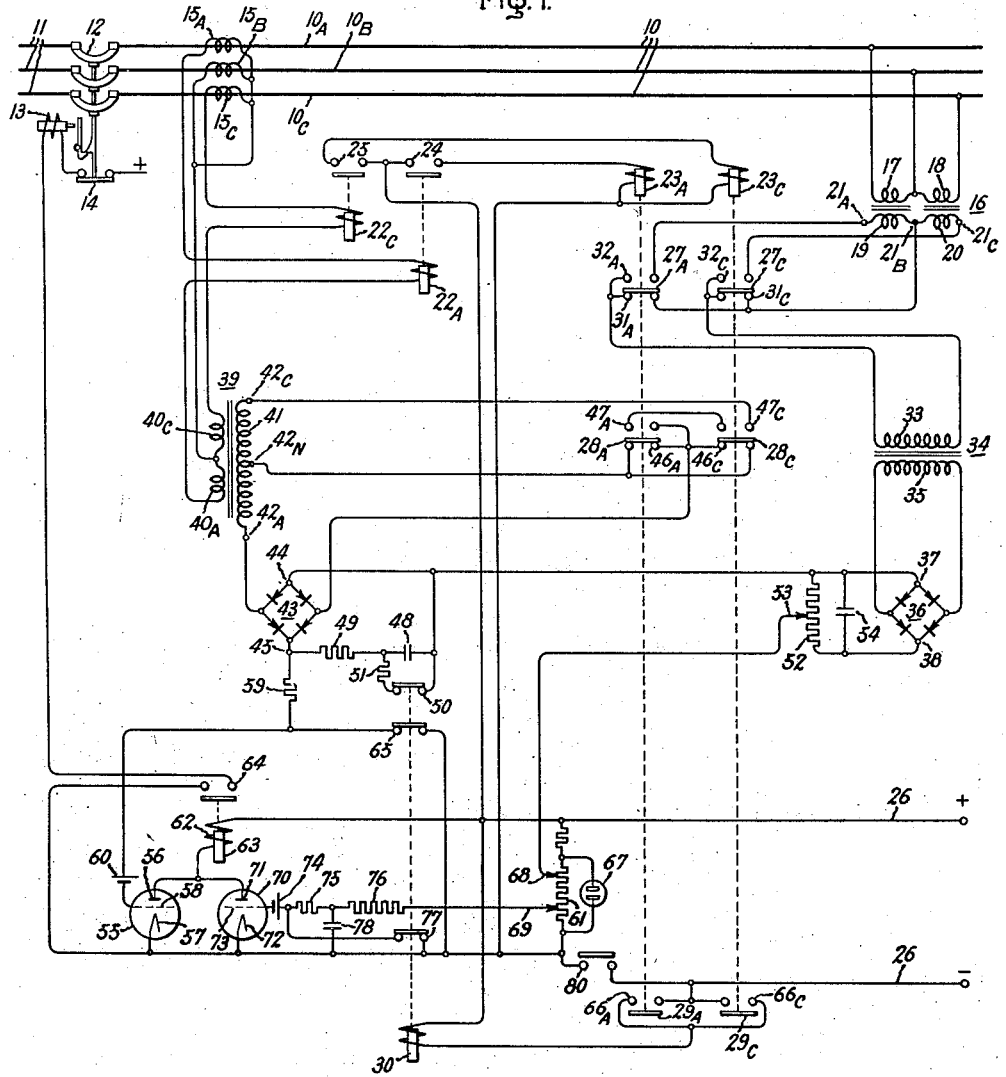
Figure 2:
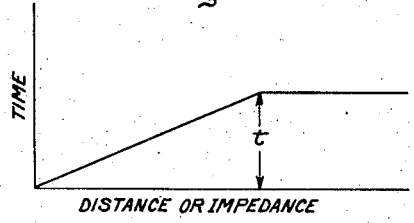

For a better understanding of my invention reference may be had to the accompanying drawing in which Fig. 1 is a schematic diagram of a protective system embodying my invention and Fig. 2 is a graph to aid in understanding the operation of my invention.

Referring now to Fig. 1 I have illustrated a polyphase alternating current circuit 10 which has been specifically illustrated as a three-phase alternating current circuit having phase conductors 10A, 10B and 10c, respectively. The protected circuit of my invention is connected to an associated electric circuit 11 through circuit interrupting means generally indicated at 12 so that in the event of a fault on the protected section 10 this portion of the circuit may be isolated from circuit 11 by means of a circuit interrupting means 12. Circuit interrupting means 12 has been specifically illustrated as a latched closed circuit breaker having a trip coil 13 and an "a" switch 14 which is closed when the circuit breaker is closed and opened when the circuit breaker is opened.

My invention could be incorporated in a distance relay which affords protection against all types of fault which might occur on three-phase alternating current circuit 10 or it may be incorporated in a distance relay which protects only against line-to-line faults on protected circuit 10 or it may be used with a distance relay which protects only against ground faults. For simplifying the disclosure I have chosen to illustrate my invention in Fig. 1 as concerned with a distance relay for protecting circuit 10 against line-to-line faults thereon. In my copending application Serial No. 383,309, filed March 14, 1941, it was shown that a polyphase distance relay will have the same distance response under all line-to-line fault conditions, neglecting load currents, if the delta or line-to-line voltages involved in the fault are used to tend to restrain operation of the distance relay and the effective delta current of the faulted phase conductors is used to tend to cause operation of the distance relay. The expression "line-to-line" is used in this disclosure in the generally accepted sense as including only two lines or phase conductors. In other words, neglecting load currents the following equations will represent the currents and voltages which should be utilized to give the proper distance response under line-to-line fault conditions.

$$\frac{E_{AB}}{I_A - I_B} = Z_1 \qquad (1)$$

when phase conductors A and B are faulted $$\frac{E_{BC}}{I_B - I_C} = Z_1 \qquad (2)$$

when phase conductors B and C are faulted $$\frac{E_{CA}}{I_C - I_A} = Z_1 \qquad (3)$$

when phase conductors C and A are faulted where E represents a voltage quantity of the circuit, I represents a current quantity, $Z_1$ represents the positive phase sequence impedance of the protected circuit between the relay and the fault or, in other words, the distance measured by the distance relay and the subscripts A, B and C refer to the phase conductors 10A, 10B, and 10c respectively.

Under line-to-line fault conditions, however, the currents flowing in the two faulted lines are equal and 180 degrees out of phase. With this in mind Equations 1, 2 and 3 above for the particular phases involved in the fault, may be simplified as follows in terms of only two of the currents of the circuit:

$$\frac{E_{AB}}{I_A} = 2Z_1 \quad (1a)$$

when phase conductors A and B are faulted $$\frac{-E_{BC}}{I_C} = 2Z_1 \quad (2a)$$

when phase conductors B and C are faulted $$\frac{E_{CA}}{\frac{(I_C - I_A)}{2}} = \frac{-E_{CA}}{I_A} = \frac{E_{CA}}{I_C} = 2Z_1 \quad (3a)$$

when phase conductors C and A are faulted

From Equations $1a$, $2a$, and $3a$ it is obvious that, neglecting load currents, for line-to-line fault conditions the same distance response under all line-to-line faults can be obtained if the line-to-line voltage involved in the fault is used as the voltage quantity for restraining the operation of the electroresponsive device and a predetermined one of two of the line currents involved in the fault or one half the difference between these two line currents is used as the current quantity to tend to cause operation of the electroresponsive device.

Accordingly, I provide for each phase conductor $10_A$, $10_B$, and $10_C$ of protected circuit 10 a current transformer designated as $15_A$, $15_B$, and $15_C$ respectively, from which line current quantities may be obtained for energizing the electroresponsive device to be described hereinafter. Also in order to obtain the necessary line-to-line or delta voltage quantities from protected circuit 10, I provide a so-called open delta potential transformer 16 having primary windings 17 and 18 respectively connected to alternating current circuit 10 and secondary windings 19 and 20 which are provided with terminals $21_A$, $21_B$, and $21_C$, the terminal $21_B$ being a common terminal between windings 19 and 20. The subscripts A, B and C associated with the terminals 21 indicate for example, that a voltage $E_{AB}$ may be obtained across terminals $21_A$ and $21_B$, and a voltage $E_{BC}$ may be obtained across terminals $21_B$ and $21_C$, and a voltage $E_{AC}$ may be obtained across terminals $21_A$ and $21_C$.

In order to satisfy the relationships expressed in Equations $1a$, $2a$ and $3a$ above, it is necessary to obtain different currents and different potentials from current transformers 15 and potential transformer 16 in dependence upon the particular type of line-to-line fault on protected circuit 10. To control these connections, I provide fault detectors $22_A$ and $22_C$ which in turn control auxiliary relays $23_A$ and $23_C$ respectively. The fault detector $22_A$ is connected in series with the secondary winding of current transformer $15_A$ while the fault detector $22_C$ is connected in series with the secondary winding of current transformer $15_C$. Accordingly, if a line-to-line fault involving phase conductors $10_A$ and $10_B$ occurs on protected circuit 10, fault detector $22_A$ will be energized to close its contacts 24. In such a case fault detector $22_C$ will not be energized. In the event that the line-to-line fault involves phase conductors $10_B$ and $10_C$ only fault detector $22_C$ will be energized to close its contacts 25. If, on the other hand, the fault on protected circuit 10 is a line-to-line fault involving phase conductors $10_A$ and $10_C$, then both fault detectors $22_A$ and $22_C$ will be energized to close their respective contacts 24 and 25. Whenever fault detector $22_A$ is energized and contacts 24 are closed, auxiliary relay $23_A$ is energized since a source of direct current control potential 26 is connected across the winding thereof. Similarly, when contacts 25 are closed, auxiliary relay $23_C$ is energized across control potential 26 and if both contacts 24 and 25 are closed, the control potential 26 is connected across the windings of both auxiliary relays $23_A$ and $23_C$. Each of the auxiliary relays $23_A$ and $23_C$ are provided with potential switching contact controlling members 27, a current switching contact member 28, and an auxiliary contact controlling member 29 for controlling the energization of a third auxiliary relay 30 to be described hereinafter. The contact controlling members 27, 28 and 29 are specifically designated by the subscripts A or C depending on whether they are controlled by auxiliary relay $23_A$ or $23_C$. Each of the potential circuit controlling members 27 are adapted to bridge a set of normally closed contacts 31 or a set of normally open contacts 32 which are connected in a circuit across terminals $21_A$, $21_B$, and $21_C$ of potential transformer 16 in such a manner that the winding 33 of an auxiliary potential transformer 34 is energized with the potential $E_{AB}$ if the fault involves phase conductor $10_A$ and $10_B$ of protected circuit 10 when only fault detector $22_A$ and auxiliary relay $23_A$ are energized. If the fault on protected circuit 10 involves phase conductors $10_B$ and $10_C$ so that fault detector $22_C$ and auxiliary relay $23_C$ only are energized, the potential $E_{BC}$ will be impressed across the winding 33 of auxiliary potential transformer 34. If the fault involves phase conductors $10_A$ and $10_C$ so that both fault detectors $22_A$ and $22_C$ and both auxiliary relays $23_A$ and $23_C$ are energized, the contact-controlling members $27_A$ and $27_C$ will control the circuit between potential transformer 16 and auxiliary potential transformer 34 so that a potential $E_{AC}$ will be impressed across the winding 33 of the latter transformer. The auxiliary potential transformer 34 has a secondary winding 35 which is connected across two terminals of a full wave rectifier 36 so that a direct current potential proportional to the voltages $E_{AB}$, $E_{BC}$ or $E_{CA}$ will appear across the terminals 37 and 38 of full wave rectifier 36 in the event of line-to-line faults involving phase conductors designated by corresponding subscripts. It will be obvious, therefore, that with the arrangement described thus far, the voltage quantities expressed in Equations $1a$, $2a$ and $3a$ above are readily obtained in rectified form across the terminals 37 and 38 of full wave rectifier 36. In view of the rectification the negative sign associated with one term of Equation $2a$ is immaterial.

In order to obtain the proper current quantities expressed by the equations referred to above, the current transformers $15_A$, $15_B$, and $15_C$ are connected in Y-relationship, each of the secondary windings of these transformers having a common terminal. The other terminals of the windings $15_A$, $15_B$, and $15_C$ are suitably connected to a current transformer 39 illustrated as having two primary windings $40_A$ and $40_C$. One terminal of winding $40_A$ and one terminal of winding $40_C$ is connected with the other terminal of the corresponding secondary windings of current transformer $15_A$ and $15_C$ respectively. The other terminals of windings 40A and 40c are connected together and to the common terminal of the Y-connected secondary windings of transformers 15A, 15B, and 15c, while the other terminal of the secondary winding of current transformer 15B is connected to this common terminal. The secondary winding 41 of current transformer 39 is provided with two end terminals 42A and 42c and a middle terminal 42N. These terminals 42 are connected through suitable contacts controlled by contact controlling means 28A and 28c to a full wave rectifier 43 having direct current terminals 44 and 45 respectively. Contact controlling means 28A and 28c each control a set of normally closed contacts 46 and a set of normally open contacts 47 which have been designated by the appropriate subscripts A and C respectively.

Whenever a line-to-line fault occurs on protected circuit 10 between phase conductors 10A and 10B, contact controlling member 28A closes contacts 47A and opens contacts 46A, whereby full wave rectifier 43 is connected across terminals 42A and 42N so that it is energized only with the current $I_A$, neglecting load currents. Similarly, if the fault involves phase conductors 10B and 10C contact controlling member 28C will open contacts 46C so that full wave rectifier 43 is connected across the terminals 42A and 42N to be energized with a potential proportional to the current $I_C$ flowing in phase conductor 10c of protected circuit 10. In the event of a line-to-line fault between phase conductors 10A and 10C, contacts 47A and 47C will be closed by virtue of energization of auxiliary relays 23A and 23C respectively, so that full wave rectifier 43 is connected across the terminals 42A and 42C of current transformer 39. Consequently a direct current potential will appear across the terminals 44 and 45 of rectifier 43 proportional to $$\left(\frac{I_C - I_A}{2}\right)$$

since the effective portion of secondary winding 41 has twice as many turns as when a fault between phase conductors 10A and 10B or 10B and 10C exists.

From the above discussion it will be obvious that a rectified potential will appear across rectifier 43 proportional to the current expressed by Equations 1a, 2a, and 3a above, and a rectified potential will appear across rectifier 36 proportional to the potentials expressed by Equations 1a, 2a, and 3a, so that if these rectified quantities are properly combined in an electroresponsive device the same distance response, neglecting load currents, for all line-to-line faults on protected circuit 10 will be obtained.

As in the mechanical distance relays used heretofore, the rectified voltage quantity proportional to the voltage causing fault current to flow in circuit 10 is utilized in my electroresponsive device in order to prevent operation thereof. This is based upon the fact that under fault conditions, the voltage will tend to reduce and consequently, if the voltage is high, it is desirable to tend to prevent operation. On the other hand, the rectified voltage quantity proportional to the fault current in the circuit is used to cause operation of the electroresponsive device described hereinafter. Consequently, the voltage across rectifier 43 which will be hereinafter referred to as $V_I$ is connected in opposition to the voltage appearing across terminals 37 and 38 of rectifier 36 which is hereinafter referred to as $V_E$. This is accomplished by interconnecting terminals 37 and 44 as indicated in Fig. 1. If the other terminals 38 and 45 are connected across the control circuit of an electroresponsive device to cause operation thereof whenever the potential $V_I$ exceeded the potential $V_E$ a distance relay having the same distance response for all line-to-line faults would be provided.

In order to provide a distance relay which has a time of action dependent upon the distance, I provide a capacitor 48 and serially arranged resistor 49 connected across the terminals 44 and 45 of rectifier 43. Normally capacitor 48 is short-circuited through the normally closed contacts 50 of auxiliary relay 30. A suitable resistor 51 having a relatively low resistance is connected in series with contacts 50 to prevent welding thereof upon closing of contacts 50. Whenever contacts 50 are opened, capacitor 48 is charged at a rate dependent upon the direct current potential appearing across terminals 44 and 45 of rectifier 43. Whenever the potential across capacitor 48 hereinafter referred to as $V_C$ has risen sufficiently to equal the voltage across terminals 37 and 38 it is desired to cause isolation of protected circuit 10 as by opening of circuit breaker 12. The higher the fault current, of course, the faster will condenser 48 become charged and the lower the voltage across rectifier 36, the sooner will the voltage across capacitor 48 reach the value of the voltage across rectifier 36. In other words the charging time of condenser 48 is directly proportional to voltage and inversely proportional to current or in other words is proportional to distance. In order to adjust for the distance to which the distance relay of my system will reach, I provide a potentiometer 52 connected across the terminals 37 and 38 of rectifier 36. The adjustable tap 53 of potentiometer 52 will, accordingly permit a variation in the distance response of the distance relay of my invention. A suitable smoothing capacitor 54 may also be provided across rectifier 36 if desired.

One way of causing circuit breaker 12 to open its contacts whenever the voltage $V_C$ across capacitor 48 reaches the potential appearing across potentiometer 52, is to provide as shown in Fig. 1 an electric discharge valve 55 having an anode 56, a cathode 57, and a control electrode or grid 58. The potential across terminal 45 and adjustable terminal 53 is impressed on the grid-to-cathode circuit of electric discharge valve 55 which circuit includes a current limiting resistor 59, a suitable fixed biasing potential 60, and an adjustable biasing potential obtained across a potentiometer 61. Potentiometer 61 is connected across source of D.-C. potential 26 and is adjusted so that the grid-to-cathode potential of electric discharge valve 55 attains its critical or firing value when the voltage $V_C$ just equals the voltage appearing across the effective portion of potentiometer 52. The anode 56 of electric discharge valve 55 is connected to the positive potential terminal of source 26 through the winding 62 of tripping relay 63 which controls contact 64 connected in series with trip coil 13 of circuit breaker 12. Whenever electric discharge valve 55 is rendered conductive in response to a line-to-line fault on protected circuit 10, tripping relay 63 is energized to close contacts 64 and cause opening of circuit breaker 12. It should be understood that electric discharge valve 55 may be any of the well-known electric discharge valves available. If electric discharge valve 55 is of the vapor-discharge type it is possible to dispense with tripping relay 63 which acts as a seal-in relay since once electric discharge valve 55, if of the vapor-discharge type, has been rendered conductive it will continue to conduct current until "a" switch 14 is opened.

In order to be sure that electric discharge valve 55 cannot be rendered conductive unless a line-to-line fault occurs on protected circuit 10 I provide a circuit including contacts 65 connected across the grid-to-cathode circuit of electric discharge valve 55. Contacts 65 are normally closed by a contact controlling member operated by auxiliary relay 30. Relay 30 is not energized unless contact controlling members 29A or 29c are operated to close their respective contacts 66A or 66c. The closing of either of these contacts will cause energization of relay 30. As long as relay 30 is not energized, contacts 65 are closed to maintain grid 58 of electric discharge valve 55 below the potential of cathode 57 as determined by biasing potential 60 illustrated as a battery.

To prevent any fluctuations of the potential of source 26 from adversely affecting the operation of electric discharge valve 55 I connect a suitable glow tube 67 across potentiometer 61 which latter has adjustable terminals 68 and 69 whereby a constant potential is obtained therefrom.

In the event that fault detectors 22A and 22c or either one of them indicate a line-to-line fault on protected circuit 10, electric discharge valve 55 will operate in a time dependent upon the distance between the distance responsive device of my invention and the fault as has been described above. If, however, for some reason electric discharge valve 55 does not operate within a predetermined time after auxiliary relay 30 is energized to permit capacitor 48 to charge, it would be desirable to cause operation of circuit breaker 12 upon the expiration of such predetermined time. Accordingly, I provide electric discharge valve 70 having an anode 71, a cathode 72 and a control electrode or grid 73. The anode-cathode circuit of electric discharge valve 70 is connected in parallel with electric discharge valve 55. The grid-to-cathode circuit of electric discharge valve 70, on the other hand, includes a source of negative biasing potential 74, current limiting resistors 75 and 76, and an adjustable biasing potential obtained across a portion of potentiometer 61 through adjustable terminal 69. Under normal conditions electric discharge valve 70 is maintained non-conductive by a circuit including contacts 77 which circuit maintains the grid 73 below cathode potential by an amount determined by biasing means 74. Contacts 77 are normally closed by virtue of a contact controlling member operated by auxiliary relay 30, and these contacts 77 correspond exactly in their function to contacts 65 associated with electric discharge valve 55. In order to get a definite time delay between opening of contact 77 and the operation of electric discharge valve 70, I provide a capacitor 78 connected between resistors 75 and 76 to the cathode 72 of electric discharge valve 70. Resistor 75 is considerably lower in ohmic value than resistor 76. It will be obvious to those skilled in the art that if the ohmic value of resistor 75 were zero that the voltage appearing across capacitor 78 when contacts 77 are closed is zero. When contacts 77 are opened, capacitor 78 will begin to charge to a value dependent upon the voltage obtained from potentiometer 61 and when this value of voltage is sufficient to overcome the negative bias impressed on the control circuit of electric discharge valve 70, electric discharge valve 70 will be rendered conductive to operate tripping or seal-in relay 63 to cause operation of circuit breaker 12. By suitably adjusting the values of resistors 75 and 76, the time elapsing between the opening of contacts 77 and operation of electric discharge valve 70 may be varied. If desired, resistors 75 and 76 may comprise a single resistor, and capacitor 78 may be adjustably connected thereto so that a sort of vernier action is obtained to control the time elapsing before electric discharge valve 70 will operate.

In order to be sure that the distance protective apparatus described thus far only operates for faults on protective circuit 10 and not for faults on circuit 11, it is desirable to render the distance relay ineffective when the line-to-line fault is not on circuit 10. Consequently a suitable directional relay, not shown, will be provided with contacts schematically illustrated at 80 which are closed only when a fault occurs on protected section 10. These contacts are indicated as connected in series with the source of control potential 26 so that unless the fault is on protected circuit 10, none of the auxiliary relays 23A, 23c, and 30 can be energized.

In view of the detailed description given above the operation of the time proportional to distance relay of my invention will be obvious to those skilled in the art and consequently only a very brief discussion of the operation will be included. Of course, unless the fault is on protected circuit 10, contacts 80 of the directional relay, not shown, will not be closed and no operation of the protective apparatus of my invention can occur. However, in the event of a fault on protected circuit 10, contacts 80 of the directional relay will be closed and the fault detector 22A, or 22c or both will operate to control the respective auxiliary relays, and to insure that the proper current and potential are supplied to rectifiers 36 and 43. Through operation of auxiliary relay 30, capacitor 48 is permitted to become charged by the potential appearing across the terminals 44 and 45 of rectifier 43 which potential is proportional to the fault current. As soon as this potential $V_c$ reaches the potential across potentiometer 52 which is proportional to the fault voltage, electric discharge valve 55 is rendered conductive to cause operation of circuit breaker 12. By definition the voltage across a capacitor is equal to $$\frac{Q}{C}$$

where Q is the charge in coulombs and C is the capacitance in farads. Also for direct currents by definition $Q=It$, or $$V=\frac{It}{C}$$

where I is current in amperes and $t$ is time in seconds. From this is it obvious that the voltage across capacitor 48 is linear with respect to time so that a substantially linear relationship of time versus distance for my electroresponsive device is obtained as is indicated in Fig. 2. By means of properly adjusting resistor 75 and 76, electric discharge valve 70 may be caused to operate after the time $t$ indicated in Fig. 2 to provide the desired back-up protection.

It will be obvious that with the arrangement described above, a very inexpensive so-called distance relay or protective system employing a distance relay whose time of operation is dependent upon the distance between the relay and the fault is provided, which lends itself readily to protection of electric circuits to more nearly approach the ideal of discriminating or selective protection.

While I have shown and described a particular embodiment of my invention, I do not desire my invention to be limited to the construction shown and described for it will of course be obvious that changes may be made without departing from my invention. I, therefore, aim in the appended claims to cover all such changes and modifications as fall within the true spirit and scope of my invention.

What I claim as new and desire to secure by Letters Patent of the United States is:

1. In a protective system for protecting a polyphase alternating current circuit against line-to-line faults thereon comprising means for obtaining a predetermined alternating current quantity from said circuit dependent upon the particular line conductors involved in the fault, means for obtaining a predetermined alternating voltage quantity from said circuit dependent upon the particular line conductors involved in the fault, means for rectifying said alternating current quantity, means for rectifying said alternating voltage quantity, a capacitor, means responsive to a line-to-line fault on said circuit for charging said capacitor at a rate dependent upon the rectified alternating current quantity, and electro-responsive means responsive to the charge on said capacitor reaching a predetermined value relative to the magnitude of said rectified alternating voltage quantity.

2. In a protective system for protecting a polyphase alternating current circuit against line-to-line faults thereon comprising switching means for obtaining a predetermined alternating current quantity from said circuit dependent upon the particular line conductors involved in the fault, switching means for obtaining a predetermined alternating voltage quantity from said circuit dependent upon the particular line conductors involved in the fault, means for rectifying said alternating current quantity, means for rectifying said alternating voltage quantity, a capacitor, means responsive to a line-to-line fault on said circuit for changing said capacitor at a rate dependent upon the rectified alternating current quantity, and electroresponsive means responsive to the charge on said capacitor reaching a predetermined value relative to the magnitude of said rectified alternating voltage quantity.

3. In a protective system for protecting a polyphase alternating current circuit against line-to-line faults thereon comprising means for obtaining a predetermined alternating current quantity from said circuit dependent upon the particular line conductors involved in the fault, means for obtaining a predetermined alternating voltage quantity from said circuit dependent upon the particular line conductors involved in the fault, means for rectifying said alternating current quantity, means for rectifying said alternating voltage quantity, a capacitor, means responsive to a line-to-line fault on said circuit for changing said capacitor at a rate dependent upon the rectified alternating current quantity, electro-responsive means responsive to the charge on said capacitor reaching a predetermined value relative to the magnitude of said rectified alternating voltage quantity, and a second electro-responsive means for performing a controlling action after said predetermined time has elapsed.

4. In a protective system for protecting a polyphase alternating current circuit against line-to-line faults thereon comprising switching means for obtaining a predetermined alternating current quantity from said circuit dependent upon the particular line conductors involved in the fault, switching means for obtaining a predetermined alternating voltage quantity from said circuit dependent upon the particular line conductors involved in the fault, means for rectifying said alternating current quantity, means for rectifying said alternating voltage quantity, a capacitor, means responsive to a line-to-line fault on said circuit for charging said capacitor at a rate dependent upon the rectified alternating current quantity, electroresponsive means responsive to the charge on said capacitor reaching a predetermined value relative to the magnitude of said rectified alternating voltage quantity, and a second electroresponsive means for performing a controlling action after said predetermined time has elapsed.

5. In a protective system for protecting a polyphase alternating current circuit against line-to-line faults thereon comprising switching means for obtaining a predetermined alternating current quantity from said circuit dependent upon the particular line conductors involved in the fault switching means for obtaining a predetermined alternating voltage quantity from said circuit dependent upon the particular line conductors involved in the fault, means for rectifying said alternating current quantity, means for rectifying said alternating voltage quantity, and an electroresponsive means operative to perform a controlling function when a predetermined relationship between the rectified current and voltage quantities exists.

6. In a protective system for a polyphase circuit, a capacitor, switching means responsive to a single phase fault involving any line conductor on said circuit for selectively controlling the connections of said capacitor to said circuit so that said capacitor is charged at a rate dependent upon the current in the faulted line conductor, and means responsive to a predetermined relationship between the voltage across said capacitor and a voltage of said circuit.

7. In a protective system for a polyphase circuit, a capacitor, switching means responsive to any single phase line-to-line fault on said circuit for connecting said capacitor to said circuit so that the capacitor is charged at a rate dependent upon the current in one of the line conductors involved in the fault, and means responsive to a predetermined relationship between the voltage across said capacitor and the voltage between the line conductors involved in the fault.

8. In a protective system for a polyphase circuit, a rectifier having an input circuit, and switching means responsive to a single phase line-to-line fault on said circuit for selectively connecting said rectifier to said circuit so that only a current proportional to the current in one of the line conductors involved in the fault flows through the input circuit of said rectifier.

9. In a protective system for a polyphase circuit, a rectifier having an input circuit and an output circuit, switching means responsive to a single phase line-to-line fault on said circuit for selectively connecting said rectifier to said circuit so that only a current proportional to the current in one of the line conductors involved in the fault flows through the input circuit of said rectifier, a capacitor, means responsive to a single phase line-to-line fault on said circuit for charging said capacitor from the output circuit of said rectifier, and control means dependent upon the voltage across said capacitor.

10. In a protective system for a polyphase circuit, a rectifier having an input circuit and an output circuit, switching means responsive to a single phase line-to-line fault on said circuit for selectively connecting said rectifier to said circuit so that only a current proportional to the current in one of the line conductors involved in the fault flows through the input circuit of said rectifier, a capacitor, means responsive to a single phase line-to-line fault on said circuit for charging said capacitor from the output circuit of said rectifier, and means responsive to a predetermined relationship between the voltage across said capacitor and the voltage between the line conductors involved in the fault.

11. In a protective system for a polyphase circuit, a rectifier having an input circuit and an output circuit, switching means responsive to a single phase line-to-line fault on said circuit for selectively connecting said rectifier to said circuit so that only a current proportional to the current in one of the line conductors involved in the fault flows through the input circuit of said rectifier, a capacitor, means responsive to a single phase line-to-line fault on said circuit for charging said capacitor from the output circuit of said rectifier, a second rectifier having input terminals and output terminals, switching means responsive to a single phase line-to-line fault on said circuit for selectively connecting said second rectifier to said circuit so that only a voltage proportional to the voltage between the line conductors involved in the fault is applied across the input terminals of said second rectifier, and control means responsive to a predetermined relation between the voltage across said capacitor and the voltage across the output terminals of said second rectifier.

12. In a protective system for a polyphase circuit, a rectifier having input terminals, and switching means responsive to a single phase line-to-line fault on said circuit for selectively connecting said rectifier to said circuit so that only a voltage proportional to the voltage between the line conductors involved in the fault is applied across the input terminals of said rectifier.

ALBERT R. van C. WARRINGTON.

CERTIFICATE OF CORRECTION.

Patent No. 2,381,375.                                August 7, 1945.

ALBERT R. van C. WARRINGTON.

It is hereby certified that error appears in the printed specification of the above numbered patent requiring correction as follows: Page 5, first column, line 50 and line 69-70, for the word "changing" read --charging--; and that the said Letters Patent should be read with this correction therein that the same may conform to the record of the case in the Patent Office.

Signed and sealed this 27th day of November, A. D. 1945.

Leslie Frazer

(Seal)                         First Assistant Commissioner of Patents.